(12) United States Patent
Kuhn et al.

(10) Patent No.: US 10,705,252 B2
(45) Date of Patent: Jul. 7, 2020

(54) PALEOGEOGRAPHIC RECONSTRUCTION OF AN AREA OF THE EARTH CRUST

(71) Applicant: SHELL OIL COMPANY, Houston, TX (US)

(72) Inventors: Philipp Kuhn, Rijswijk (NL); Malcolm Ross, Houston, TX (US); Cornelis Wilhelmus Maria Van Oosterhout, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 377 days.

(21) Appl. No.: 15/555,904

(22) PCT Filed: Mar. 4, 2016

(86) PCT No.: PCT/US2016/020912
§ 371 (c)(1),
(2) Date: Sep. 5, 2017

(87) PCT Pub. No.: WO2016/144763
PCT Pub. Date: Sep. 15, 2016

(65) Prior Publication Data
US 2018/0052253 A1 Feb. 22, 2018

(30) Foreign Application Priority Data

Mar. 6, 2015 (EP) .................................... 15157917
Feb. 18, 2016 (EP) .................................... 16156387

(51) Int. Cl.
*G01V 99/00* (2009.01)
(52) U.S. Cl.
CPC ................................. *G01V 99/005* (2013.01)

(58) Field of Classification Search
CPC ..................................................... G01V 99/005
USPC ............................................................ 703/10
See application file for complete search history.

(56) References Cited

U.S. PATENT DOCUMENTS 4,821,164 A * 4/1989 Swanson ............... G01V 1/282
2/919
8,229,950 B2 * 7/2012 Savary-Sismondini ....................
G01V 99/005
702/13
2003/0216897 A1 11/2003 Endres et al.
(Continued)

OTHER PUBLICATIONS

International Search Report and Written Opinion received for PCT Patent Application No. PCT/US2016/020912, dated Jun. 1, 2016, 8 pages.

*Primary Examiner* — Rehana Perveen
*Assistant Examiner* — Justin C Mikowski (57) ABSTRACT

A Paleo Event Table creator tool box is described which is induced and/or allows a user to spatially join a selected area of interest of the earth crust to one selected tectonic plate in a tectonic plate model, which selected tectonic plate has an overlap with the area of interest, and to sample a paleogeographic dataset relevant to the area of interest for a series of paleogeographic time steps. A graphical user interface is induced and/or allows the user to create a Paleo Event Table that displays the sampled paleogeographic dataset. The Paleo Event Table creator tool box is used for paleogeographic reconstruction of the earth crust in the area of interest and identifying information relevant for the area of interest.

19 Claims, 8 Drawing Sheets

(56) References Cited

U.S. PATENT DOCUMENTS

| | | | |
|---|---|---|---|
| 2010/0167256 A1* | 7/2010 | Blash | G06F 16/29 |
| | | | 434/308 |
| 2010/0257004 A1 | 10/2010 | Perlmutter et al. | |
| 2011/0264430 A1* | 10/2011 | Tapscott | G01V 99/00 |
| | | | 703/10 |
| 2012/0117124 A1* | 5/2012 | Bruaset | G06F 16/2246 |
| | | | 707/797 |
| 2016/0209544 A1* | 7/2016 | Minguez | G01V 99/005 |

* cited by examiner

PALEOGEOGRAPHIC RECONSTRUCTION OF AN AREA OF THE EARTH CRUST

CROSS REFERENCE TO EARLIER APPLICATIONS

This is a US national stage application of International application No. PCT/US2016/020912, filed on Mar. 4, 2016, which claims benefit of priority of European application No. 15157917.4, filed on Mar. 6, 2015, and of European application No. 16156387.9, filed on Feb. 18, 2016.

FIELD OF THE INVENTION

The invention relates to a method and system for paleogeographic reconstruction of an Area Of Interest (AOI) of the earth crust.

BACKGROUND OF THE INVENTION

Paleogeographic analysis and reconstruction of prehistoric sedimentary basins plays a key role in the field of petroleum geology, because prehistoric geomorphological environments of the Earth's crust are preserved in stratigraphic records that may indicate whether hydrocarbon deposits, such as crude oil and/or natural gas, may be present.

Paleogeographic experts may also collect evidence from fossils, bottom samples and stratigraphic records to develop paleogeographic theories regarding prehistoric continental drift and plate tectonic movements, to reconstruct prehistoric continents, such as Pangaea, and oceans, such as Panthalassa, including their shapes and latitudinal and longitudinal locations during prehistoric times, such as the Middle Devonian period of about 385 Million years ago (Ma).

In conventional paleogeographic reconstruction techniques a geospatial dataset relating to an Area Of Interest (AOI) would generally be rotated to positions in the past using a plate model. Based on this paleo tectonic reconstruction a manual selection area may be identified and unreconstructed to present day to be co-analyzed with other present day datasets.

A downside of this conventional approach is the vast amount of information (data) that needs to be reconstructed to the past and unreconstructed to present day.

Alternatively, a present day location may be rotated to the past, based on the plate model, and with these paleo-spatial coordinates through time paleo grids of different data types at different ages may be sampled. This limits the sampling to times in the past for which paleo reconstructed datasets are available.

U.S. Pat. No. 8,229,950 discloses a Paleoneighborhood Hydrocarbon Spatial System that provides a paleogeographic search system locating geoscience data relevant to a geographic search aperture. This known paleogeographic search system comprises a geodatabase, an interface, a paleogeographic reconstruction engine, and a host processor. The paleogeographic engine is configured to transform the geographic search aperture according to tectonic plate movements to a transformed search aperture that the geographic search aperture occupied in a geological age of interest. The host processor is configured to apply a paleoaugmented geographic search aperture to a geodatabase for additional oil exploration data relevant to the geographic search aperture today. The paleoaugmented geographic search aperture is defined by augmenting the transformed search aperture to include relevant proximal locations for the selected geological age of interest to create an augmented transformed search area; and transforming the augmented transformed search aperture, according to tectonic plate movements, to the paleoaugmented geographic search aperture in present day world geography.

The system of U.S. Pat. No. 8,229,950 is found to comprise a complex iterative workflow, where a selected AOI is manually defined in present day and brought to the past while preserving the aperture shape of the AOI.

There is a need for a more efficient rigorous, structured and time efficient approach how to sample relevant areas and/or data in the paleo domain, which does not rely on paleo-geographies which have to be drafted for every time interval in the geological past. These paleo-geographies are current not available at a time and spatial resolution.

Furthermore there is a need for an improved paleogeographic reconstruction method and system, which does not require reconstruction of vast geospatial datasets into the geological past, thereby significantly reducing the computationally demands and associated computation errors and reducing the amount of time necessary to precondition additional new paleogeographic datasets.

Furthermore there is a need for an improved paleogeographic reconstruction engine with a Graphical User Interface (GUI) that allows a user to create a user defined Paleo Event Table (PET) that displays a sampled paleogeographic dataset in a user friendly manner.

SUMMARY OF THE INVENTION

In one aspect of the invention there is provided a method for paleogeographic reconstruction of a selected Area Of Interest (AOI) of the earth crust, the method comprising providing:
a) a tectonic plate model, which divides the earth crust into a series of adjacent plate sections and their motion history through time;
b) a PET creator tool box, which is induced and/or allows a user to spatially join a selected AOI to one selected tectonic plate in the tectonic plate model, and to sample one or more paleogeographic datasets with information relevant to the AOI for a series of paleogeographic time steps; and
c) a Graphical User Interface (GUI) that is induced and/or allows the user to create a Paleo Event Table that displays the sampled paleogeographic dataset(s) in a user friendly manner.

The selected tectonic plate may have an overlap with the AOI. The series of paleogeographic time steps span a time window at a sampling rate. The time window and/or the sampling rate may be user-defined by the user, suitably via the GUI.

In one group of examples, the PET creator tool box provided under step b may be induced to:
i) generate a paleogeographic reconstruction of plate sections in a region that includes an effective AOI, by running the paleogeographic tectonic plate model for the effective AOI to selected times throughout a geological timeframe of interest identified by the user, which effective AOI comprises at least the selected AOI;
ii) generate an event table which based on the reconstruction of step i) identifies which parts of neighboring plate(s) and/or basin sections intersect with the effective AOI at the selected times;
iii) highlight overlap areas of the identified intersecting neighboring plates by cookie cutting sub-crop areas of the plates that intersect with the effective AOI;

iv) provide each highlighted overlap area with a time tag and a plate code of an original plate which overlapped with the effective AOI;

v) unreconstruct the highlighted overlap areas from the different paleogeographic time steps to identify recent areas of the plates that were overlapping with the effective AOI in the past;

vi) sample the paleogeographic datasets, including point, line, polygon and raster data, with information tagged with recent geographic locations for different paleogeographic time intervals based on steps i)-v); and vii) display in the GUI the obtained paleogeographic datasets and/or datasets obtained by other available paleogeographic reconstruction software packages in the PET.

In another aspect of the invention there is provided a system for paleogeographic reconstruction of a selected Area Of Interest of the earth crust. The system comprising a computer readable medium, which, when connected to a computer, induces the computer to execute the method for paleogeographic reconstruction of the selected AOI of the earth crust.

The system may comprise a paleogeographic reconstruction engine equipped with a PET creator tool box stored at the computer readable medium with algorithms for:

i) generating a paleogeographic reconstruction of plate sections in a region that includes an effective AOI, by running the paleogeographic tectonic plate model for the effective AOI to selected times throughout a geological timeframe of interest identified by the user, which effective AOI comprises at least the selected AOI;

ii) generating an event table which based on the reconstruction of step i) identifies which parts of neighboring plate(s) and/or basin sections intersect with the effective AOI at the selected times;

iii) highlighting overlap areas of the identified intersecting neighboring plates by cookie cutting sub-crop areas of the plates that intersect with the effective AOI;

iv) providing each highlighted overlap area with a time tag and a plate code of an original plate which overlapped with the effective AOI;

v) unreconstructing the highlighted overlap areas from the different paleogeographic time steps to identify recent areas of the plates that were overlapping with the effective AOI in the past;

vi) sampling the paleogeographic datasets, including point, line, polygon and raster data, with information tagged with recent geographic locations for different paleogeographic time intervals based on elements i)-v); and vii) displaying the obtained datasets and/or datasets obtained by other available paleogeographic reconstruction software packages in an output PET in a GUI.

The paleogeographic dataset used in the system and the method may comprise the following datasets:

A) a Global attribute dataset, which holds worldwide data for point locations that are resampled to basins in which they are located, or line, or polygon, or raster data, for each attribute that will populate the output Paleo Event Table (PET);

B) the tectonic Plate model dataset of the earth crust that displays a paleogeographic motion history of the earth crust through time;

C) a Paleo location query list, which identifies which plate parts were intersecting with a selected AOI in the past;

D) AOI-specific attribute information, which combines data obtained from the Paleo location query list and from the Global attribute dataset to extract attribute information for a plate area within the AOI at any specific time;

E) AOI-specific plate model information which identifies into which azimuthal directions and with which velocity rates continental plates have moved in the past; and F) an Output PET dataset in which the AOI-specific attribute information and the AOI-specific plate model information are combined.

These and other features, embodiments and advantages of the method and system according to the invention are described in the accompanying claims, abstract and the following detailed description of non-limiting embodiments depicted in the accompanying drawings, in which description reference numerals are used which refer to corresponding reference numerals that are depicted in the drawings. Similar reference numerals in different figures denote the same or similar objects. Objects and other features depicted in the figures and/or described in this specification, abstract and/or claims may be combined in different ways by a person skilled in the art.

DETAILED DESCRIPTION OF THE DEPICTED EMBODIMENTS

In this specification and claims the following abbreviations and definitions are used:
AOI Area of interest
AOI$^+$ plus an additional buffer zone surrounding the AOI
Effective AOI AOI or AOI$^+$
GUI Graphical user interface
KB kilo byte
Ma Million years ago
Mio yr Million years
PET Paleo Event Table
Plate model Datasets that include the fundamentals on how the plates rotated trough time to determine their locations at a specific time in the past. The datasets may also include plate shapes of the plates.

Described herein is a paleogeographic reconstruction engine equipped with a Paleo Event Table (PET) creator tool box stored at a computer readable medium with algorithms for:

i) running the tectonic plate model for an effective AOI (the selected AOI or expanded AOI (AOI$^+$)) to display a paleogeographic reconstruction for the effective AOI;

ii) generating a PET that identifies which parts of neighboring plates intersect with the effective AOI at selected time steps within a geological timeframe of interest;

iii) highlighting overlap areas of the identified intersecting neighboring plates by cookie cutting sub-crop areas of the plates that intersect with the effective AOI;

iv) providing each highlighted overlap area with a time tag and a plate code of an original plate which overlapped with the effective AOI;

v) unreconstructing the highlighted overlap areas from the different time steps in the past to identify recent areas of the plates that were overlapping with the effective AOI in the past;

vi) sampling paleogeographic datasets with information tagged with recent geographic locations for different paleogeographic time intervals based on steps i)-v); and vii) displaying the obtained datasets and/or datasets obtained by other available paleogeographic reconstruction software packages in an output PET at a Graphical User Interface (GUI).

The algorithms may further comprise displaying another paleogeographic distribution of plates around the effective AOI prior to said unreconstructing.

The GUI may be configured to display the PET in a stratigraphic format, and to permit the user to browse through the PET and open additional columns for different plates and to use filters to display selected information and to understand a variability in the effective AOI related to a stretching of the effective AOI across different plates.

The paleogeographic reconstruction method, system and PET creator tool box described herein are intended to allow subsurface professionals, including explorationist, seismic interpreters and basin modellers, to familiarize themselves with the geological context in a time efficient and user friendly manner. It comprises a paleogeographic event table basic list of events that need to be considered when working in a specific area and creates awareness for data already available, but which is often difficult to be located and accessed. This overview on the important data/events may be accomplished by sampling (worldwide-) datasets with events on a plate to basin scale, supplemented by spatial and temporal information. The data for a selected Area Of Interest (AOI) may be visualized in a time stratigraphic table, which enables the user to select information most significant to him/her.

In this specification various aspects of the paleogeographic method and PET tool box according to the invention are described, including a workflow for a user, a Graphical User Interface (GUI) to help the user create a pre-defined, or at least partially user defined, PET for AOI selected by the user, and underlying paleogeographic reconstruction processes that may be programmed in associated PET tool box computer software algorithms.

In the following detailed description, a high level overview is provided of steps of a work flow in the method according to the invention and a suitable infrastructure and background processes are described for generating the GUI that enables a user to generate the PET, and to explore the resulting output.

Paleogeographic reconstruction functionalities of the PET creator tool box may enable users to efficiently conduct paleogeographic reconstruction procedures. Associated computing processes programmed into computer software algorithms run in the background for correct functioning of the PET creator tool box according to the invention. Capabilities, input and output GUIs, basic functionalities of the PET creator tool box and development steps for developers of GUI and/or PET kernels are also described.

The PET creator tool box may be used by a subsurface professional working on a project in a spatial limited AOI located somewhere on the globe. To be able to understand the greater context of the available dataset, it is important to have a good understanding of the evolution of the regional context of the project in the basin or on the plate and which additional events in neighboring regions could have had an influence or which information from surrounding locations in nearby regions could be used in the actual AOI. To be provided with a first pass overview of the relevant events the subsurface professional can use the PET. The information that has to be provided by the user are the AOI (and a number to scale a potential buffer zone), the time window of interest (e.g. from present to X Ma)) and a sampling rate in millions of years (Mio yr).

Figure 1:
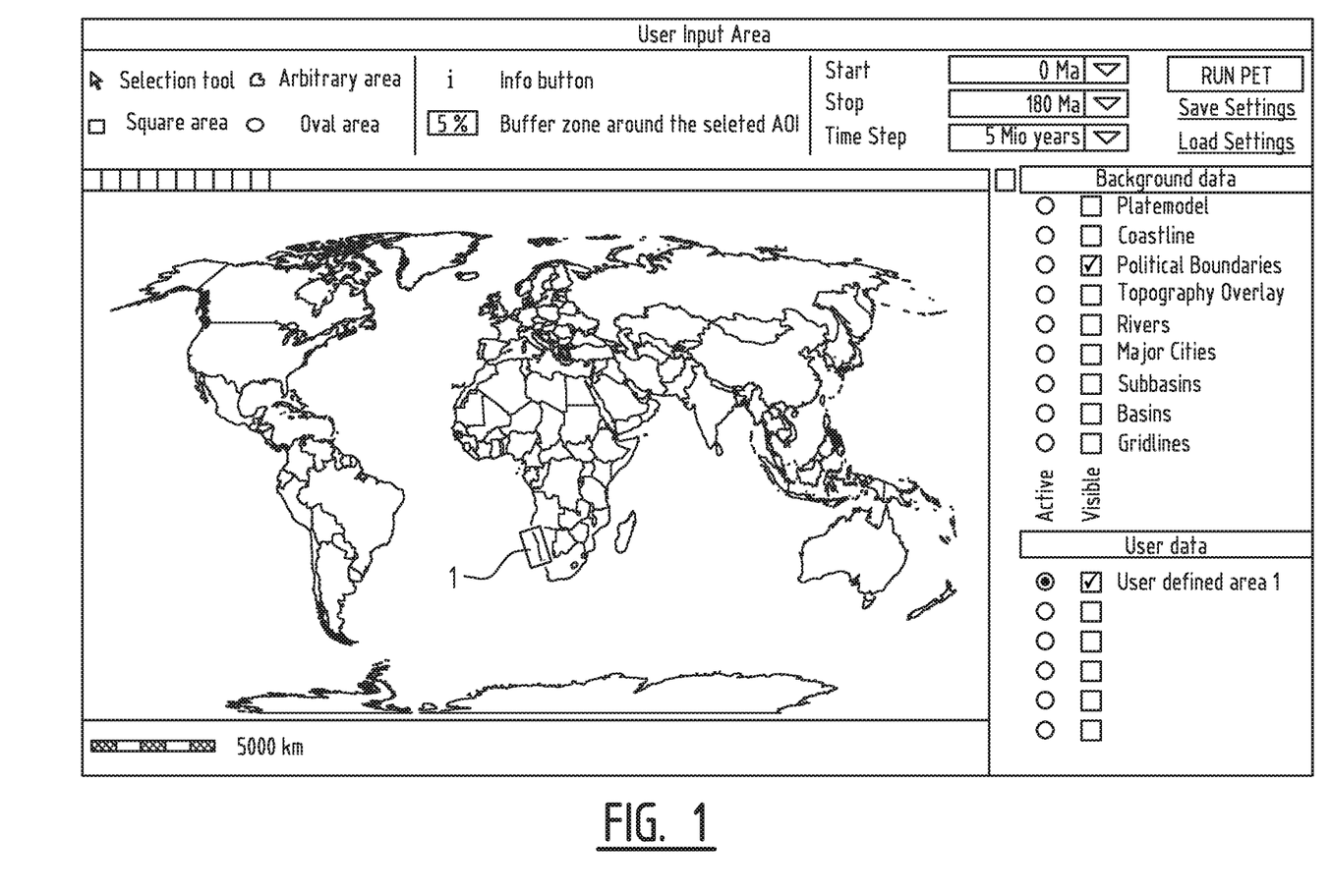
FIG. 1 shows an input GUI of a PET creator tool box.

FIG. 1 illustrates a suitable Graphical User Interface (GUI) of the PET tool box. To prepare the PET in accordance with the method and with the PET creator tool box, one or more of the following steps may be conducted.

First, the user opens a computer program containing the PET creator tool box, and indicates, as illustrated in FIG. 1, an AOI 1 of his/her search on a world map (via the input GUI). PET input data, such as the size of a buffer zone around the AOI, to generate an AOI$^+$, may be user defined, or be predefined as a percentage in a manner that can be changed by the user. In the example shown in FIG. 1 the percentage is set at 5% in a manner that can be changed by the user. FIG. 1 also illustrates that the GUI provides a user friendly interface between the user and the PET tool box that will enable the user to make quickly and accurately paleogeographic reconstructions of any selected AOI of the earth crust without manipulating vast paleogeographic datasets that would slow down and reduce the accuracy of the reconstruction.

Figure 2:
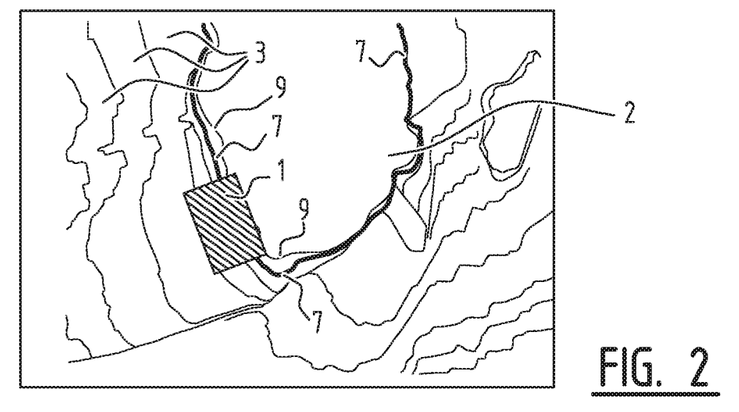
FIG. 2 shows a selected AOI linked to a plate on a geographic map.

The Paleo Event Table creator tool box may be used for paleogeographic reconstruction of the earth crust in the AOI or AOI$^+$ and identifying information relevant for the AOI or AOI$^+$. The PET creator tool box links the selected AOI 1 to a plate on the geographic map that shows plate outlines. The selected AOI 1 suitably spans across a plurality of oceanic and continental terrenes. As example, FIG. 2 shows a next screen of the GUI of the PET tool box which shows the plate outline map on which the selected AOI 1 is located south west of the African continent and spans across oceanic and continental terrenes. The African continent is represented in this Figure by continental plate 2, and is bounded by a continental boundary 7. Part of the continental plate 2 extends below the sea surface, as indicated the small area between the continental boundary 7 and coast line 9. Also visible in FIG. 2 are numerous oceanic plates 3.

The AOI 1 selection may be done based on an arbitrary shape, which is indicated by the user, where the GUI may link the AOI 1 to an associated plate or other shape on the geographic map in any pre-shaped file format.

In addition, the user may identify a time window for which the user wishes to extract data from the database, for example from present (which may be a default starting time) to 200 Ma. Also, a sampling rate, which determines the output resolution, may be determined (if not defined, a default value may be employed, for instance set at 10 Ma). This may be included the GUI. The selected outboard AOI 1 indicated in FIG. 1 will be used to explain the workflow in the following paragraphs.

Figure 3:
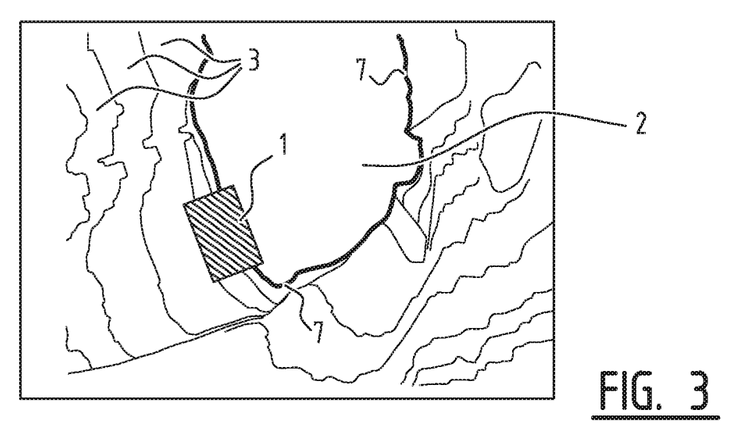
FIG. 3 shows a selected continental plate in the geographic map.

To be able to rotate the AOI 1 to its past locations, based on the information defined in the underlying plate model, the AOI 1 as defined in the previous step is joined to the underlying plate model as illustrated in FIG. 3. In the present example, the AOI 1 is locked to one selected continental plate 2.

The selected AOI may have significant overlap with several adjacent plate sections. The PET creator tool box may be induced to automatically and/or may allow the user to manually spatially join the selected AOI to the plate section that has the largest overlap with the selected AOI or that is preferred for this PET run. If the selected AOI has a substantially similar overlap with several adjacent plate sections that form part of different tectonic plates the PET creator tool box may be induced to automatically identify the sizes of the different tectonic plates and to join the selected AOI to the largest of the different tectonic plates. However, if the selected AOI has a significant overlap with a plate section that forms part of a tectonic plate that was created at a time after a selected paleogeographic time of interest, then the PET creator tool box may be induced to, and/or allow the user to, join the selected AOI to another adjacent tectonic plate that was created before the selected paleogeographic time of interest.

The PET creator tool box may be configured to automatically identify and automatically join the AOI 1 to the continental plate that is most representative for the AOI 1. This may be done based on a set of three hierarchical rules:
1. The continental plate that has the widest overlap zone with the AOI 1 is selected.
2. If the overlapping area of two or more different plates with the AOI 1 is the same, then the bigger (greater area) plate of these two or more different plates is selected.
3. If the selected continental plate 2 is only created at a certain time or disappears soon after the starting date (e.g. the existence of the selected plate is not given for at least some percentage, for instance 50%, of the time interval defined for sampling), an alternative neighboring plate may be identified.

Alternatively, the user is allowed to manually select the plate that is preferred for this PET run, to which the AOI is spatially joined. Suitably, the selected tectonic plate was created before a selected paleogeographic time of interest so that it will be available during the entire PET run.

In any case, the AOI 1 is then locked to the identified selected tectonic plate, suitably a continental plate 2, as illustrated in FIG. 3.

Figure 4:
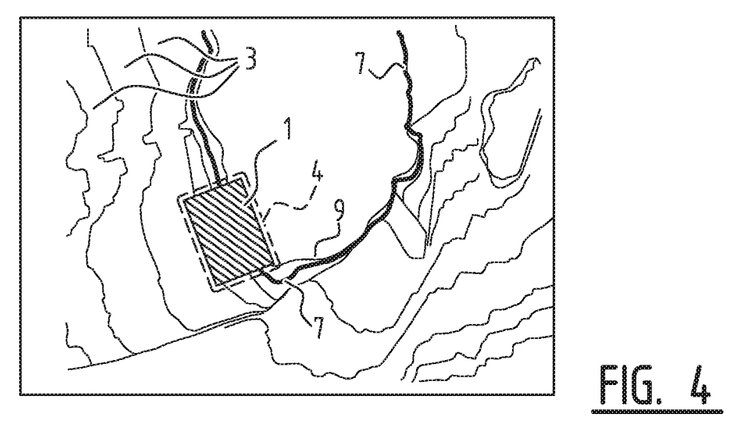
FIG. 4 shows an AOI and a dotted buffer zone to form an AOI$^+$.

FIG. 4 illustrates the AOI 1 may be extended by a buffer zone. Often when a predetermined polygon is used to determine the AOI (e.g. the outline of a basin model) it would be of interest to extend the search area slightly beyond the polygon to be able to capture information that is located in the near neighborhood of the AOI. To enable such an extension without manually redrawing the polygon, it is possible to extend the AOI by a buffer zone to create the extended AOI 1 which is denoted by AOI$^+$ 4. The buffer zone can be defined by several means. One simple solution is to extend the outline of the polygon by a certain percentage (e.g. 5%) of the mean of the longest and shortest AOI axis. If a buffer zone is required by the user (buffer zone value>0 in the GUI), the outline of the AOI$^+$ 4 will be indicated in the GUI map display.

Figure 5:
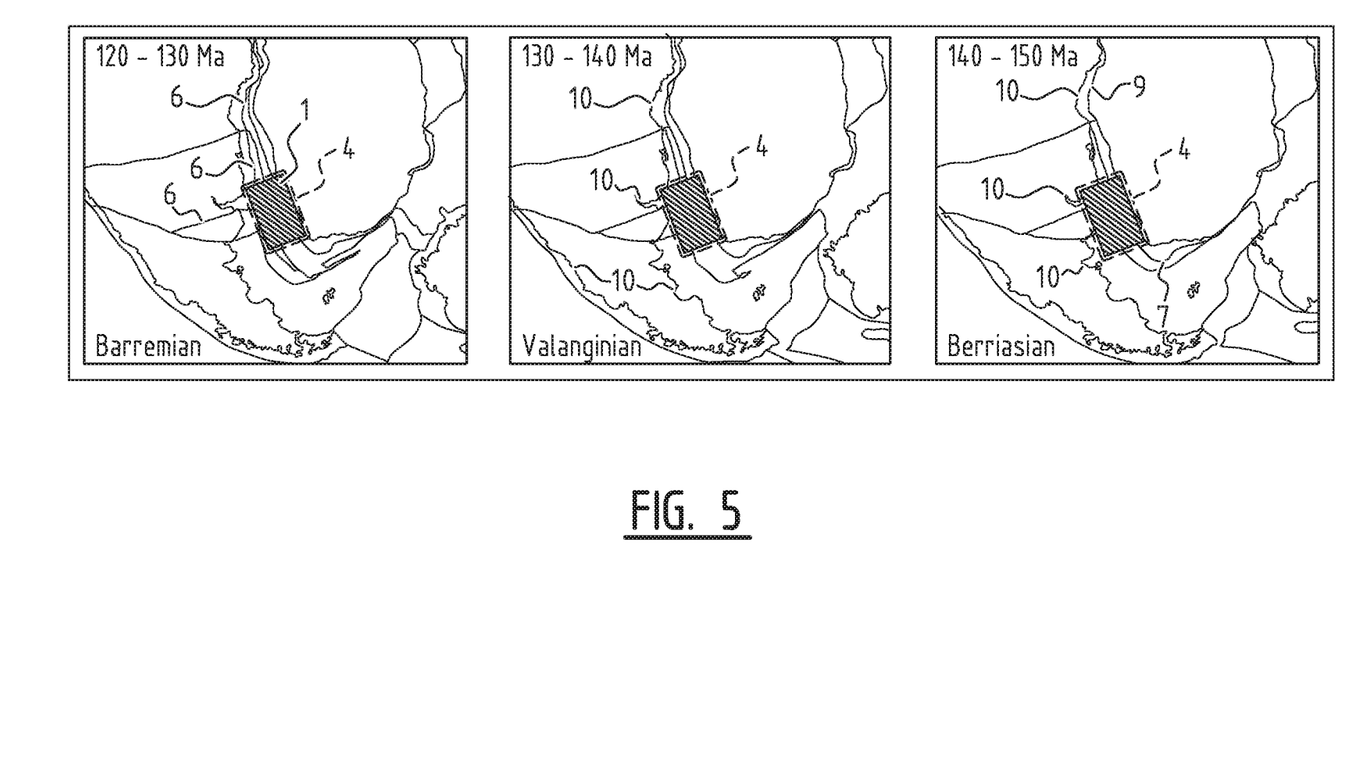
FIG. 5 shows the AOI$^+$ spanning across the closing Atlantic ocean for time steps between 120 and 150 Ma.

FIG. 5 illustrates how the PET tool box may run the plate model for the identified AOI 1 or AOI$^+$ 4, to display a paleogeographic reconstruction for the individual sampling time steps. Three time steps are shown in the example of FIG. 5: 120-130 Ma (Barremian); 130-140 Ma (Valanginian); and 140-150 Ma (Berriasian). The South American coast line 10 and the African coast line 9 are indicated in FIGS. 5 and 6 for reference.

After determining the input parameters in the previous steps, an event table is requested. This starts a process of identifying which parts of neighboring plates intersect with the AOI$^+$ 4 at certain time thoughout a timeframe of interest defined by the user. FIG. 5 illustrates how the AOI$^+$ 4, which in this example is locked to the African plate, is rotated with the African plate through time. Changing plates are intersecting with the AOI$^+$ 4 at different time steps. In 120-130 Ma mainly the oceanic plates are intersected with the AOI$^+$ 4, while in a subsequent sampling step of the reconstruction (e.g. 140-150 Ma) also the plates of the South American continent overlap with the AOI$^+$ 4.

Figure 6:
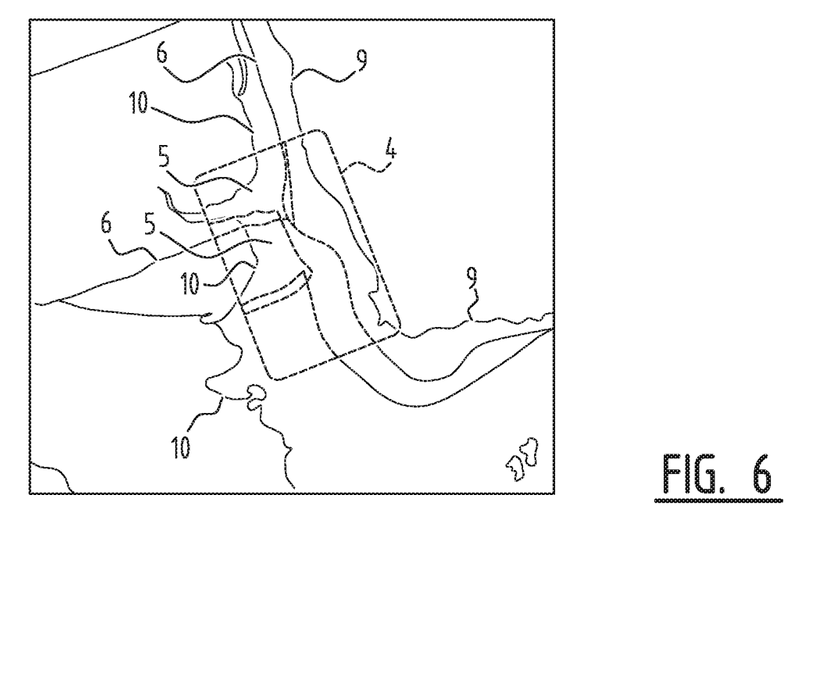
FIG. 6 shows cookie cut sub-crop areas of plates intersecting with AOI$^+$ at time step 140-150 Ma.

Plate boundaries 6 between plates of the South American continent that overlap with the AOI$^+$ have been visually included in FIG. 6. FIG. 6 illustrates how the PET creator tool box may highlight overlap areas by cookie cutting sub-crop areas of the plates that intersect with the AOI$^+$ at a time step of interest. In this example the time step 140-150 Ma is used. These cookie cut areas are highlighted by stippled lines 5 in FIG. 6 and each cookie cut area is provided with a hatching pattern. One or more of these stippled lines 5 coincide with the plate boundaries 6 as indicated. It can be seen that neighboring cookie cut areas can have regions of overlap, as indicated by cross hatching. For each time step (sampling rate dependent) the area of each plate that intersects with the AOI$^+$ 4 is identified with a cookie cutter process and captured with a time tag. Additionally, the plate code of the original plate which overlapped with the AOI$^+$ 4 may be included in the dataset.

Figure 7:
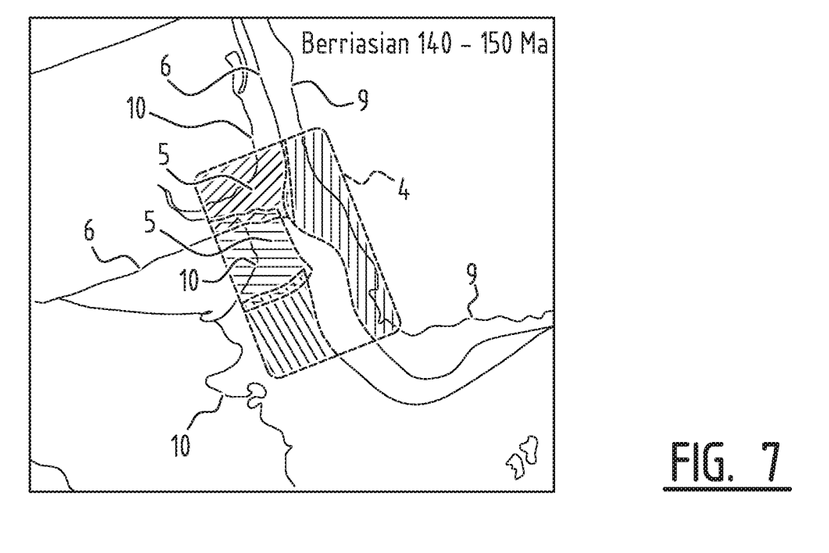
FIG. 7 shows time slices sampled on the cookie cut areas for later visualization in output PET.

The PET creator tool box may display a paleogeographic distribution of plates around the AOI$^+$ 4, as illustrated in FIG. 7. This can help the user to understand the distribution of the plates on the globe through and with respect to one another. Here it is relevant to capture the correct aperture to show enough of the globe, but to also be detailed enough to see the locations of smaller plates, which are potentially in the AOI 1 or AOI$^+$ 4.

Time slices may optionally be sampled with the cookie cut areas 5. Using the cookie cut areas 5, information available on time slice data may be sampled. Time slice data is information from a distinct time interval in the past that is allocated to its correct paleo geographic location on the globe at this time interval. The areas that overlap with the AOI$^+$ and hold information relevant to the PET are sampled for each of the cookie cut areas 5, which all represent one of the plates of the plate model (incl. their own plate code). Data of each plate may suitably be binned together based on the plate code, for later visualization in the output PET.

It is observed that the sampling of time slices is an optional intermediate step that may be skipped. It has to be identified which datasets are (only) available in paleo-reconstructed format and how dense their sampling rate is in the time domain.

Figure 8:
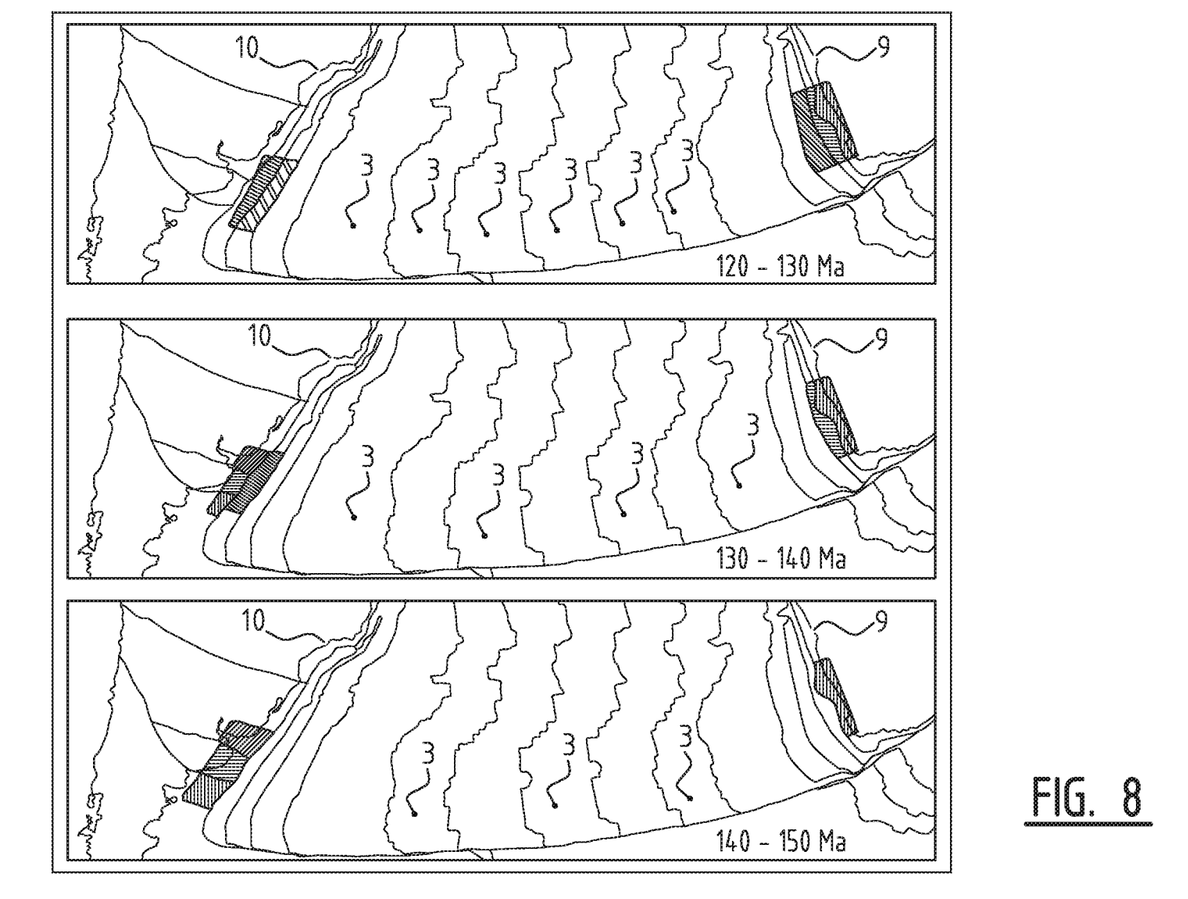
FIG. 8 shows an unreconstructed cookie cut area distribution of plate areas which overlapped with the AOI$^+$ in FIG. 4.

The cookie cut areas 5 from the different time steps in the past may subsequently be unreconstructed, to identify recent areas of the plates that were overlapping with the AOI$^+$ 4 in the past. It is important to capture the age at which these parts of the plates are important as potential neighbors to the AOI 1 or AOI$^+$ 4. FIG. 8 shows an example of an unreconstructed cookie cut area distribution of plate areas that overlapped with the AOI$^+$ 4 as displayed in FIG. 4, in the paleo reconstructed version of areas shown in FIG. 5. The hatching patterns in the cookie cut areas are preserved for reference.

Figure 9:
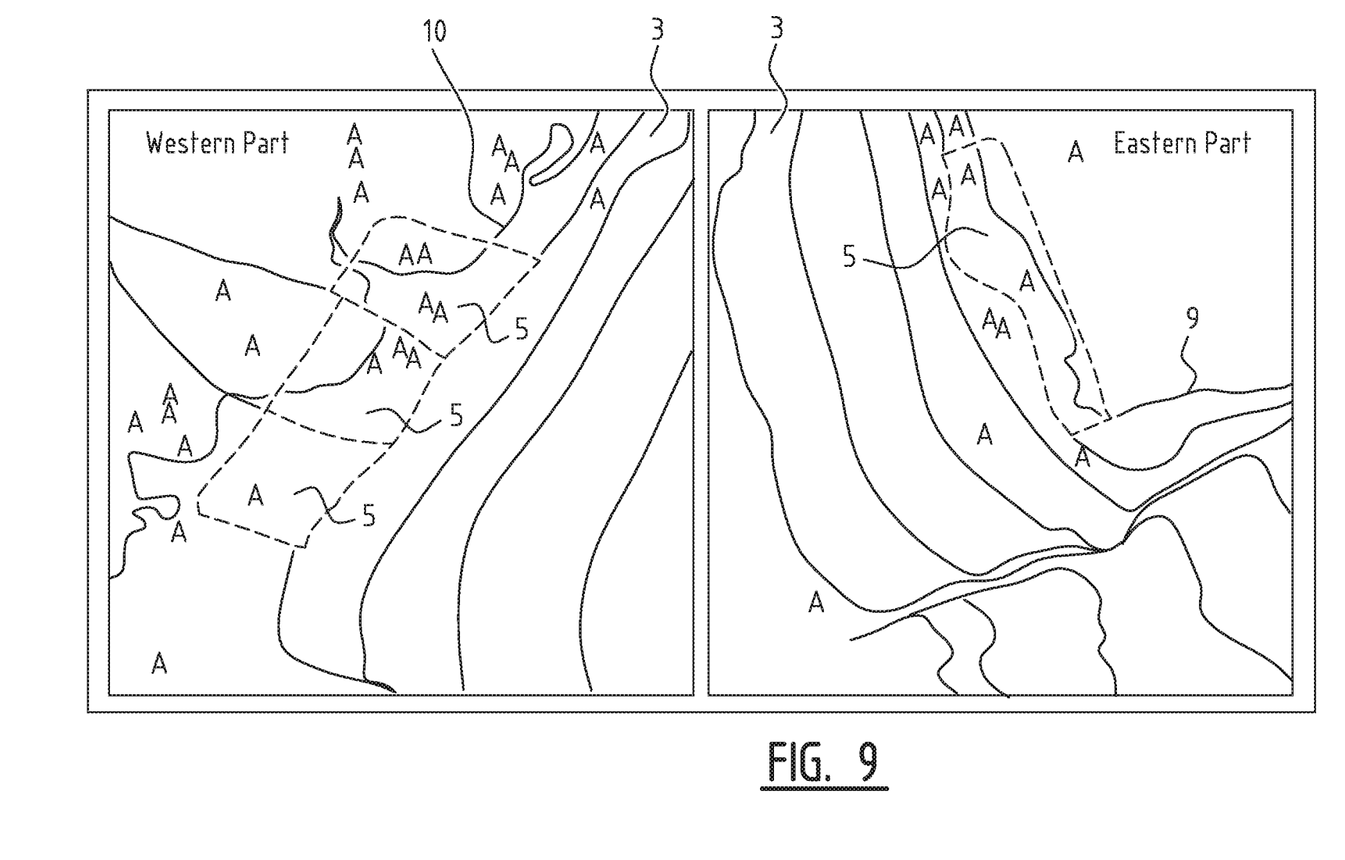
FIG. 9 shows sampling of a dataset with recent locations on both sides of the conjugant south Atlantic margin for the 140-150 Ma time step.

Subsequently, relevant datasets with information tagged with recent geographic locations may be sampled for different paleogeographic time intervals in the output PET. FIG. 9 shows an example of such sampling of data sets on both sides of the conjugant south Atlantic margin for the 140-150 Ma time step. Only the data with locations inside the unreconstructed cookie cut areas 5 are sampled. Due to the plate movement through time it is likely that for each time step slightly different areas have to be sampled. Only data which yields information that is relevant for the sampling time (step) interval and the area is captured. A time step can span across different time intervals. The default is a time step which spans from the selected time ±a half sampling rate.

Figure 10:
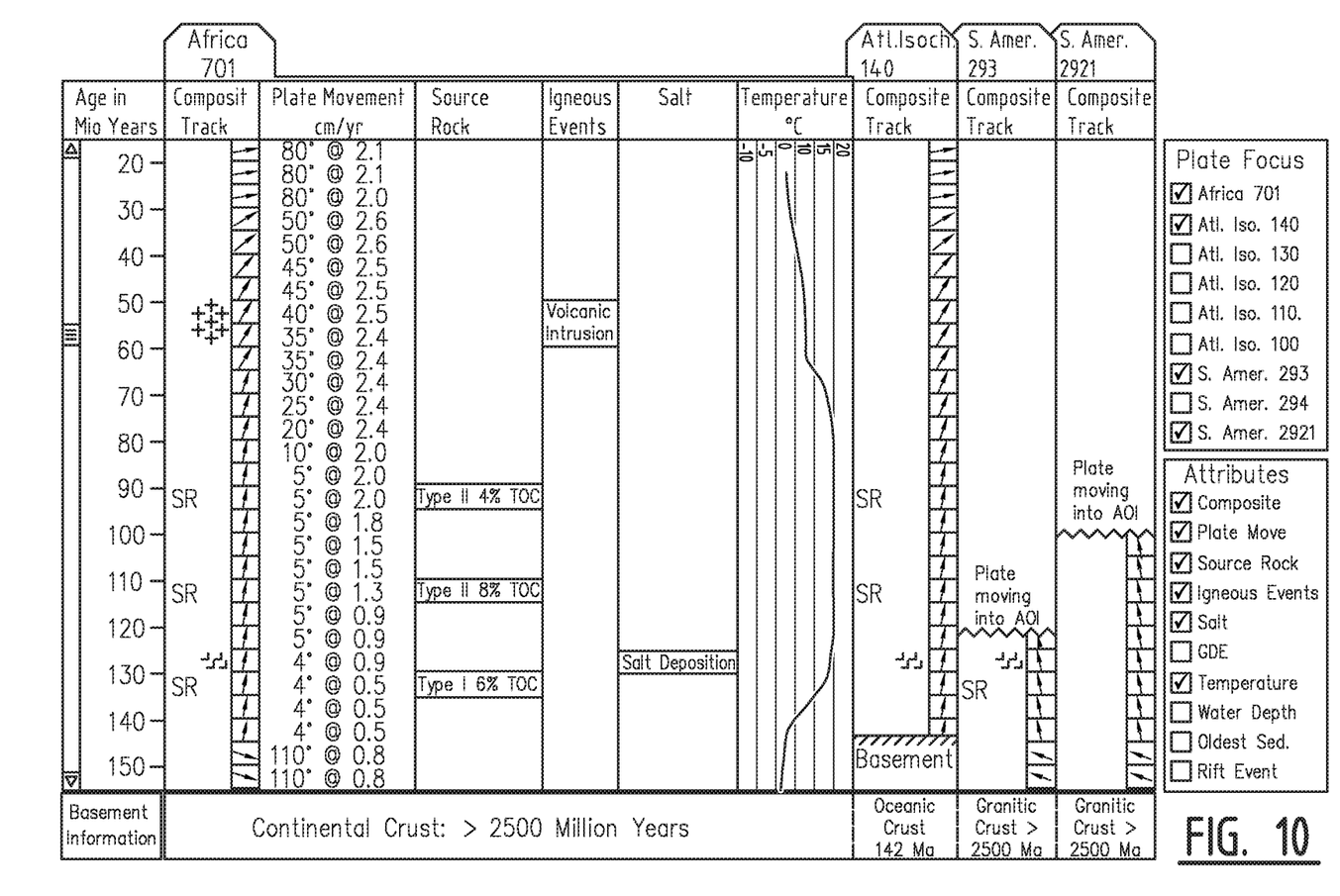
FIG. 10 shows an output PET.

Finally, an output PET is created with the PET creator tool box. An example of such an output PET is shown in FIG. 10. The data, which has been extracted from the available datasets in the previously described step of sampling data, is prepared in a user friendly output table. The data is displayed in a stratigraphy table like table. If events are not instantaneous (e.g. source rocks depositions, which are often shorter that 5 Mio yr), but longer lived (e.g. >10 Mio yr), are displayed with a beginning and end on the event table. Continuous data sets can also be displayed, e.g. the changes of the paleo water depth though time. For each (oceanic and continental) plate that overlapped with the AOI$^+$ during the time for which the datasets were sample an additional "tab" is displayed. These plates are only indicated by an additional single column appended to the table. These can be opened by clicking onto them. The information for the prime plate is displayed as a default.

The user can now start browsing through the PET and open additional columns for different plates. Additional filters can be used e.g. to display information of only one domain (e.g. GDE, Ingneous Events) to understand the variability in the AOI related to the stretching of the AOI across different plates.

In the time domain each data occurrence may be linked to a start (APPEARA) and end (DISAPPEARA) in the time domain. Here it needs to be identified if also a single event/occurrence is possible, for example if not a time interval, but a short lived event, such as e.g. a comet impact is identified.

Also continuous data may be queried and displayed by the PET creator tool according to the invention. Thus, there may be a value displayed for each sampling interval. These values may be averaged over more continuous data or interpolated between two data points to provide the right values for the selected sampling interval. Additionally, these values need to be handled slightly different when displayed in the output table.

Since all datasets are referenced to spatial locations it may be useful to run a Geographic Information System (GIS) server in the background and a suitable coding language may be used to run these automations in the most efficient way to enable a quick communications with such a GIS server back bone. In addition to the GIS server a Paleo Webservice and a PaleoTool server may be applied to capture the paleo locations and paleo neighborhoods of the plates that may have an influence on the AOI 1 in the past and thus may be included in the PET output. Therefore also a preferred plate model may be included. This choice isn't arbitrary.

Several plate models are available upon which a paleogeographic reconstruction can be made. Based on the resulting paleo location an area can be sampled. Some of these available plate models are especially valid for certain areas of the globe, while they have deficiencies in other locations. Thus, it may be necessary to use different plate models for different areas of the globe.

Figure 11:
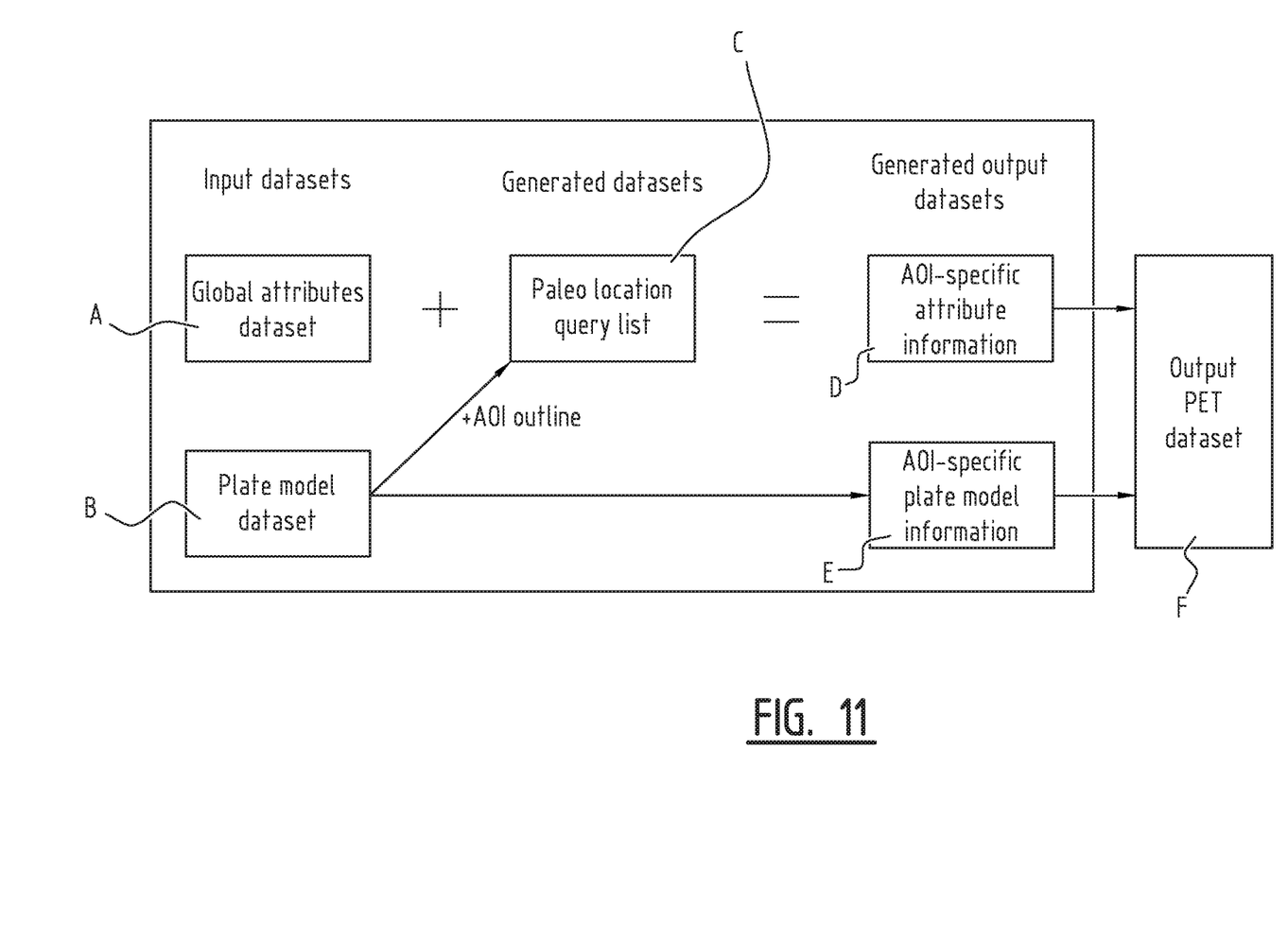
FIG. 11 shows datasets underlying the output PET.

For PET runs several different datasets may be used as an input, storage location and output locations. As example, FIG. 11 provides an overview of six datasets A-F that are presently envisioned to play a role in the method and PET tool box. These are: Global attribute datasets (A); Plate model datasets (B); a Paleo location query list (C); AOI-specific attribute information (D); AOI-specific plate model information (E); and an Output PET dataset (F). These datasets are described in more detail below.

Global attribute datasets (A) hold data for point locations that are resampled to basins in which they are located, line, polygon and/or raster data for attributes. Global attribute datasets (A) may be generated for each attribute that will populate the output PET and may have worldwide coverage. Each feature that is included in the datasets needs to have at least location information at present day and an appearance (start) and disappearance (end) time. If the feature or the activity of the feature started >600 Mio yr or persists (is active) till present, this can be indicated by values of 4500 for appearance and −9999 for disappearance. Global attribute datasets that hold data for point locations may be resamples to the basins or other spatially more extended features in which they are located. This way the point information is spread over a greater area and will not be missed that easy when sampled by a Paleo location query list, where also area polygons are used. For the joining of these datasets a general tool must be applied as a basinal cookie cutter.

The Plate model dataset (B) generally holds a model of the tectonic plates of the earth crust with a paleogeographic motion history through time. Several plate models are available upon which a paleogeographic reconstruction can be made. Based on the resulting paleo location an area can be sampled.

Some of these available plate models are especially valid for certain areas of the globe, while they have deficiencies in other locations. Thus, it may be necessary to use different plate models for different areas of the globe.

The Paleo location query list (C) generally identifies which plate parts were intersecting with a selected AOI in the past. The Paleo location query list (C) is suitably generated based on the plate model. By combining it with an effective AOI it is identified which plate parts are intersecting with the AOI or AOI$^+$ at which time in the past. In this list it is captured which plate area (as a subarea cookie cut of the original plate) has to be sampled at which time in the past.

The AOI-specific attribute information (D) contains relevant attribute information for the plate area within the AOI at any specific time. This information can be extracted by combining the Paleo location query list (C) with the Global attribute dataset (A). This is one of the output tables that are eventually used to populate the output PET.

The AOI-specific plate model information (E) identifies into which azimuthal directions and with which velocity rates continental plates have moved in the past. During the process of generating the Paleo location query list the plates within the AOI are stepwise rotated back through time based on the plate model to identify their location on the globe and to one another in the past. Based upon this information it can be identified with which velocity (rate) the plates move into which direction (azimuth). This information, together with the plate code and the appearance and/or disappearance is recorded. These hold important information for the later output table. E.g. for which time frame the plate needs to be displayed in the output table. Further, based on the movement of the plates, and especially from significant changes in the rate and azimuth a potentially important event can be inferred.

These different datasets A-E may be captured and finally the AOI-specific attribute and plate model information may be combined into one Output PET dataset (F). This Output PET dataset F is then read by the output table creation procedure to populate the output PET table. Potentially, this file needs to be accessible and readable by alternative tools that could use this data in a similar manner.

Therefore, the method and PET tool box as presently described are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. For instance, several plate models can make a palinspastic reconstruction. Where such plate model is employed, paleogeographic distributions and/or paleogeographic reconstructions recited above may be displayed in the form of palinspastic distributions and/or reconstructions. Other distributions may also be optional.

Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While systems and methods are described in terms of "comprising," "containing," or "including" various components or steps, the systems and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be cited herein by reference, the definitions that are consistent with this specification should be adopted.

The invention claimed is:

1. A method for paleogeographic reconstruction of an Area Of Interest (AOI) of the earth crust, the method comprising providing:
   a) a tectonic plate model, which divides the earth crust into a series of adjacent plate sections and their motion history through time;
   b) a Paleo Event Table (PET) creator tool box, which is induced and/or allows a user to spatially join a selected AOI to one selected tectonic plate in the tectonic plate model, which selected tectonic plate has an overlap with the AOI, and to sample a paleogeographic dataset with information for a series of paleogeographic time steps; and
   c) a Graphical User Interface (GUI) that is induced and/or allows the user to create a PET that displays the sampled paleogeographic dataset;
   wherein the PET creator tool box is induced to:
   i) generate a paleogeographic reconstruction of plate sections in a region that includes an effective AOI, by running the tectonic plate model for the effective AOI to selected times throughout a geological timeframe of interest identified by the user, which effective AOI comprises at least the selected AOI;
   ii) generate an event table which, based on the reconstruction of step i), identifies which parts of neighboring plate(s) and/or basin sections intersect with the effective AOI at the selected times;
   iii) highlight overlap areas of the identified intersecting neighboring plates by cookie cutting sub-crop areas of the neighboring plates that intersect with the effective AOI;
   iv) provide each highlighted overlap area with a time tag and a plate code of an original plate which overlapped with the effective AOI;
   v) unreconstruct the highlighted overlap areas from different paleogeographic time steps to identify recent areas of the neighboring plates that were overlapping with the effective AOI in the past;
   vi) sample the paleogeographic dataset, including point, line, polygon and raster data, with information tagged with recent geographic locations for different paleogeographic time intervals based on steps i)-v); and
   vii) display in the GUI the sampled paleogeographic dataset and/or datasets obtained by other available paleogeographic reconstruction software packages in the PET.

2. The method of claim 1, wherein the selected tectonic plate is a continental plate.

3. The method of claim 1, wherein the method further comprises inducing the PET creator tool box automatically spatially join the selected AOI to one plate, which one plate either has the largest overlap with the selected AOI of all the neighboring plates that have a significant overlap with the AOI, or is the largest tectonic plate of all of the neighboring plates that have a significant overlap with the AOI.

4. The method of claim 1, wherein the PET creator tool box allows the user to manually spatially join the selected AOI to one plate that is preferred for the PET run.

5. The method of claim 1, wherein the method is used to explore whether the selected AOI comprises geological or geospatial information relevant to hydrocarbon, such as crude oil and/or natural gas, exploration and as a step in the development of a hydrocarbon fluid exploration and production program.

6. The method of claim 1, wherein the PET creator tool box is configured to permit the user to expand the AOI with a buffer zone to form an expanded AOI hereinafter denoted as AOI+, whereby steps i)-v) are performed with the AOI+ as the effective AOI.

7. The method of claim 1, wherein the PET creator tool box is configured to permit the user to specify geologic time intervals of interest and sampling increments.

8. The method of claim 1, wherein the tectonic plate model comprises hierarchical plate polygons and their motion history through time and the PET creator tool box defines selection query areas in present day coordinates to sample any geospatially constrained dataset for a paleogeographic time step of interest selected by the user.

9. The method of claim 1, wherein displaying the paleogeographic reconstruction for the effective AOI.

10. The method of claim 1, wherein the method further comprises inducing the PET creator tool box to and/or display a paleogeographic distribution of plates around the effective AOI prior to step v).

11. The method of claim 1, wherein the PET is displayed in a stratigraphic format, and the GUI permits the user to browse through the PET and open additional columns for different plates or sedimentary basins and to use filters to display selected information and/or to understand a variability in the effective AOI related to a stretching of the effective AOI across different plates and/or basins.

12. The method of claim 1, wherein the following paleogeographic datasets are stored in the PET creator tool box:
A) a Global attribute dataset, which, for each attribute that will populate the output Paleo Event Table (PET), holds worldwide data for point locations that are resampled to basins in which they are located, or line, or polygon, or raster data;
B) a tectonic plate model dataset of the earth crust with a paleogeographic motion history of the earth crust through time;
C) a Paleo location query list, which identifies which plate parts were intersecting with a selected AOI in the past;
D) AOI-specific attribute information, which combines data obtained from the Paleo location query list and from the Global attribute dataset to extract attribute information for a plate area within the selected AOI at any specific time;
E) AOI-specific plate model information which identifies into which azimuthal directions and with which velocity rates continental plates have moved in the past; and
F) an Output PET dataset in which the AOI-specific attribute information and the AOI-specific plate model information are combined.

13. The method of claim 1, wherein the paleogeographic dataset comprises time slice data, which time slice data when available is sampled on the cookie cut sub-crop areas associated with a paleogeographic location on the earth at corresponding time steps from the series of paleogeographic time steps.

14. A system for paleogeographic reconstruction of a selected Area Of Interest (AOI) of the earth crust, the system comprising a non-transitory computer readable medium storing instructions, which, when executed by one or more computing device processors of the system, causes the system to:
a) load a tectonic plate model, which divides the earth crust into a series of adjacent plate sections and their motion history through time;
b) load a paleogeographic reconstruction engine equipped with a Paleo Event Table (PET) creator tool box; and
c) a Graphical User Interface (GUI) that is induced and/or allows a user to create a PET that displays a sampled paleogeographic dataset;
and execute instructions wherein inducing and/or allowing the user to spatially join a selected AOI to one selected tectonic plate in the tectonic plate model, which selected tectonic plate has an overlap with the AOI, and with a sampled paleogeographic dataset with information for a series of paleogeographic time steps to create a Paleo Event Table (PET) that displays sampled paleogeographic data,
wherein the PET creator tool box comprises computer executable instructions for:
i) generating a paleogeographic reconstruction of plate sections in a region that includes an effective AOI, by running the tectonic plate model for the effective AOI to selected times throughout a geological timeframe of interest identified by the user, which effective AOI comprises at least the selected AOI;
ii) generating an event table which based on the reconstruction of step i) identifies which parts of neighboring plate(s) and/or basin sections intersect with the effective AOI at the selected times;
iii) highlighting overlap areas of the identified intersecting neighboring plates by cookie cutting sub-crop areas of the neighboring plates that intersect with the effective AOI;
iv) providing each highlighted overlap area with a time tag and a plate code of an original plate which overlapped with the effective AOI;
v) unreconstructing the highlighted overlap areas from different paleogeographic time steps to identify recent areas of the neighboring plates that were overlapping with the effective AOI in the past;
vi) sampling the paleogeographic dataset, including point, line, polygon and raster data, with information tagged with recent geographic locations for different paleogeographic time intervals based on elements i)-v); and
vii) displaying the sampled paleographic dataset and/or datasets obtained by other available paleogeographic reconstruction software packages in an output PET in the GUI.

15. The system of claim 14, wherein the PET creator tool box is configured to permit the user to expand the AOI with a buffer zone to form an expanded AOI hereinafter denoted as AOI+, whereby elements i)-v) are performed with the AOI+ as the effective AOI.

16. The system of claim 14, wherein the instructions of the non-transitory computer readable medium, when executed by the one or more computing device processors of the system, cause the system to display the paleogeographic reconstruction for the effective AOI.

17. The system of claim 14, wherein the instructions of the non-transitory computer readable medium, when executed by the one or more computing device processors of the system, cause the system to display a paleogeographic or other distribution of plates around the effective AOI prior to element v).

18. The system of claim 14, wherein the GUI is configured to display the PET in a stratigraphic format, and permits the user to browse through the PET and open additional columns for different plates and basins and to use filters to display selected information to understand a variability in the effective AOI related to a stretching of the effective AOI across different plates.

19. The system of claim 14, wherein the paleogeographic reconstruction engine comprises the following paleogeographic datasets:
A) a Global attribute dataset, which, for each attribute that will populate the output Paleo Event Table (PET), holds worldwide data for point locations that are resampled to basins in which they are located, or line, or polygon, or raster data;
B) a paleogeographic tectonic plate model dataset of the earth crust that displays a paleogeographic motion history of the earth crust through time;
C) a Paleo location query list, which identifies which plate parts were intersecting with a selected AOI in the past;
D) AOI-specific attribute information, which combines data obtained from the Paleo location query list and from the Global attribute dataset to extract attribute information for a plate area within the AOI at any specific time;

E) AOI-specific plate model information which identifies into which azimuthal directions and with which velocity rates continental plates have moved in the past; and
F) an Output PET dataset in which the AOI-specific attribute information and the AOI-specific plate model information are combined.

* * * * *